3,065,187
POLY(2,3-EPOXYBUTANE)
Edwin J. Vandenberg, Wilmington, Del., assignor to Hercules Powder Company, Wilmington, Del., a corporation of Delaware
No Drawing. Filed July 26, 1960, Ser. No. 45,297
5 Claims. (Cl. 260—2)

This invention relates to new polymeric epoxides and more particularly to crystalline polymers of butene-2 epoxides.

It is well known that alkylene oxides such as ethylene oxide, propylene oxide and isobutylene oxide may be polymerized to produce valuable polymers varying from sirupy liquids to waxy solids. Such polymers may be soluble or insoluble in water but are completely soluble in ether. They are low molecular weight polymers and are used chiefly as plasticizers.

Now in accordance with this invention it has been discovered that both cis- and trans-butene-2 oxides, i.e., cis- and trans-2,3-epoxybutane, may be polymerized to yield crystalline polymers with outstanding properties. This finding was contrary to all expectations since these monomers contain two asymmetric carbon atoms, the configuration of only one of which can be influenced during the ring-opening polymerization reaction. For this reason a regular stereoconfiguration should be difficult to attain, and, hence, it was not expected that a crystalline polymer could be produced. These polymers are characterized by being insoluble in water and aliphatic hydrocarbons and, depending upon their molecular weight and other factors such as the degree of the stereospecificity of the polymerization reaction, vary from soluble to insoluble in ether. They have crystalline melting points and are shown to have a high degree of crystallinity by X-ray. It was also unexpected that, unlike many cis- and trans-isomers, rearrangement does not take place during polymerization. Instead, two polymers having different physical properties and X-ray patterns were formed. Thus, the poly(cis-butene-2 epoxide) is insoluble in chlorinated solvents such as chloroform, and aromatic solvents such as benzene, whereas the poly(trans-butene-2 epoxide) is soluble in these diluents. Another difference between the two polymers is in their widely different melting points, the trans polymer having melting points which vary within the range of around 70° C. up to about 114° C., whereas the cis polymer has much higher melting points varying from about 120° C. up to 170° C. or above.

The new crystalline butene-2 epoxide polymers of this invention find use in both plastic and wax applications. For example, the high molecular weight polymers may be fabricated into films, fibers and other plastic applications. The lower molecular weight polymers are particularly useful as synthetic waxes and as wax modifiers. Having high melting points and the polar ether linkage they contribute many desirable properties to a wax. Thus, they produce waxes with improved adhesion to many substrates, particularly paper, wood and floor coverings. Hence, they are useful for treating paper and in floor polishes. These polymers are also valuable in many other protective coatings.

The new crystalline poly(trans-butene-2 oxide) is readily fabricated into films with excellent physical properties. Preferably this polymer will have an RSV (i.e. reduced specific viscosity) of at least about 0.9, and preferably at least about 1.5 (0.1% solution in chloroform at 25° C.). Films produced from such polymers have excellent physical properties which may be further greatly enhanced by orientation. The films of poly(trans-butene-2 oxide) are not affected by water, methanol, acetone, hexane, peanut oil, etc. They are dissolved by benzene, chloroform, etc. Having a combination of fairly high moisture vapor transmission and low water absorption, coupled with excellent low temperature properties, these films are useful as packaging films and are particularly attractive for packaging frozen foods and other such uses where high water vapor transmission is desired. It can also be fabricated into various molded articles by injection, compression, and blow molding and also by vacuum forming.

The new crystalline poly(cis-butene-2 oxide) is likewise readily fabricated into films with excellent physical properties. Having a much higher melting point than the corresponding trans polymer, it is useful in the preparation of films, fibers and molded articles where high temperature resistance is needed. The strength properties can be considerably enhanced by orientation of the film, fiber, etc. This cis polymer is a particularly unique polymer. By properly controlling the molding temperature and cooling cycle during fabrication, it can easily be made into either a tough film, fiber or thermoplastic with relatively low elongation before the normal yield stress is attained, or into a quite rubberlike film, fiber, or other article, which shows considerable rubberlike extensibility (order of 100–200%), i.e. with rapid and essentially complete recovery on removing the stress. This rubberlike form is very unusual since it has a high ultimate tensile strength even though it is not cross-linked or vulcanized. Thus, a rubber can be obtained which can be fabricated by means of more economic thermoplastic technology, i.e. injection molding, blow molding, vacuum forming, etc. Either form can be advantageously, and in some cases preferably, modified with various fillers as, for example, carbon black, calcium carbonate, silica, magnesia, etc. Large amounts of such fillers can frequently be used. In many cases it is desirable to incorporate stabilizers such as antioxidants, light absorbers, acid acceptors, etc.

The new polymeric epoxides of this invention may be prepared by contacting either trans- or cis-butene-2 oxide with an aluminum alkyl as catalyst. Any aluminum alkyl may be used, as for example, a trialkylaluminum, a dialkylaluminum halide, a dialkylaluminum hydride, an alkylaluminum dihydride, a dialkylaluminum alkoxide, etc. The alkylaluminum compound may be used as such or it may be complexed with an ether such as tetrahydrofuran, a chelating agent such as acetylacetone, or with water within specified molar ranges. For the preparation of a trans polymer having an RSV of at least about 0.9 a trialkylaluminum is preferably used, which alkylaluminum compound has not been complexed or reacted with water, ether, chelating agents, etc. However, in the case of the cis-isomer, to produce a polymer having a sufficiently high molecular weight, i.e. an RSV of at least about 0.9, and preferably at least about 1.5, for use in film, fiber, etc., the aluminum alkyl used as the catalyst will be prereacted or complexed with water and/or a complexing or chelating agent. When water is used, the amount will usually be within the range of 0.5 to 1 mole of water per mole of alkylaluminum compound, but a ratio of from about 0.1:1 to about 2:1 may be used. The alkyl group of the alkylaluminum compound may be any alkyl, as, for example, methyl, ethyl, isopropyl, butyl, isobutyl, hexyl, octyl, etc.

Another factor to be considered in the preparation of the new crystalline polymers of cis- and trans-butene-2 oxides, is the purity of the monomer. It is essential that the monomer being polymerized be essentially pure cis- or trans-isomer and contain no appreciable amount of the other isomer since mixtures of the two isomers, as for example, commercial mixtures containing approximately 50% of each will not form a crystalline polymer, but instead yield only a viscous liquid or amorphous rubberlike polymer.

The polymerization reaction may be carried out in bulk but generally is carried out in a solution or suspension in an inert organic diluent. Exemplary of the diluents that may be used are the ethers such as diethyl ether, dipropyl ether, etc., halogenated hydrocarbons such as chlorobenzene, methylene chloride, etc., or a hydrocarbon diluent such as n-heptane, cyclohexane, benzene, toluene, etc.

The polymerization reaction can be carried out at any desired temperature and pressure. Usually atmospheric or autogenous pressure will be used and a temperature of from about —100° C. to about 150° C., preferably from about —10° C. to about 120° C., and more preferably from about 0° C. to about 100° C. will be used. For the trans-isomer, with the preferred trialkylaluminum catalysts, low temperatures are preferred for the polymerization, generally less than about 50° C. and preferably less than about 30° C. This isomer polymerizes with such catalysts very rapidly and, in fact, almost instantaneously even at temperatures as low as —78° C. Also surprising is the fact that high yields (almost quantitative) of crystalline polymer are obtained. In the case of the cis-isomer, the opposite situation prevails. Here to obtain crystalline polymer, high temperatures are required, i.e. preferably over 30° C., and more preferably above 50° C., and the preferred catalyst is a chelated aluminum alkyl-water reaction product.

The following examples will illustrate the preparation of the new polymeric epoxides of this invention. All parts and percentages are by weight unless otherwise indicated. The molecular weight of the polymers is shown by their reduced specific viscosity (RSV). By the term "reduced specific voscosity" is meant the $\eta sp/C$ determined on a 0.1% solution of the polymer in a given diluent. In the case of the trans polymer, the RSV is determined in chloroform, at 25° C. In the case of the cis polymer, the RSV is determined either in α-chloronaphthalene at 135° C. or in tetrachloroethane at 100° C. Where the melting point of the polymer is given, it is the temperature at which the birefringence due to crystallinity disappears. All parts and percentages are by weight unless otherwise indicated.

EXAMPLE 1

A polymerization vessel from which the air had been removed and replaced with nitrogen was charged with diethyl ether and 10 parts of trans-butene-2 epoxide. After equilibrating at 30° C., a solution of 0.8 part of triisobutylaluminum in n-heptane was added. The total diluent amounted to 17.6 parts of which 84% was diethylether. The reaction mixture was agitated and held at 30° C. for 19 hours. The polymerization was stopped by adding 4 parts of anhydrous ethanol, after which the ether-insoluble polymer was collected and purified by washing with ether, once with a 1% solution of hydrogen chloride in ethanol, then with ethanol until neutral and finally with a 0.05% solution of 4,4'-thiobis (6-tert-butyl-m-cresol) in methanol, after which the polymer was dried under vacuum. This ether-insoluble polymer was shown to have a high degree of crystallinity by its X-ray diffraction pattern. It was a hard, somewhat waxy material that was only partly soluble in chloroform at room temperature. It had a melting point of 114° C. and an RSV of 0.08 as determined on a 0.04% solution in α-chloronaphthalene at 135° C.

The ether-soluble polymer was recovered by combining the above filtrate and washes, washing the solution twice with a 3% solution of aqueous hydrochloric acid, with water until neutral, then with a 2% solution of sodium bicarbonate and finally with water. To the so-purified ether solution was added 0.5% (based on the polymer) of the same antioxidant as above and after drying, the polymer was recovered by evaporation of the ether. The polymer so obtained was a waxy solid. It was highly crystalline as shown by its X-ray diffraction pattern which was the same pattern as for the ether-insoluble polymer. It had an RSV (chloroform) of 0.06.

The ether-soluble polymer was dissolved in benzene by heating (only incompletely soluble at room temperature) and the benzene solution was filtered while hot. The polymer was precipitated with 10 volumes of methanol, separated by filtration, washed twice with methanol and then dried under vacuum for 18 hours at room temperature. The polymer so purified had a melting point of 96° C. and an RSV (in chloroform) of 0.1. It was highly crystalline as shown by X-ray having the same pattern as the previous products and had the correct carbon and hydrogen analysis for poly(trans-butene-2 epoxide). The infrared spectrum of the polymer was in agreement with its assigned structure, i.e.

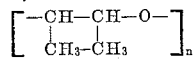

It was a hard, glossy, wax-like material.

EXAMPLE 2

Example 1 was repeated except that in this case 10 parts of cis-butene-2 epoxide was substituted for the trans-butene-2 epoxide used in that example. The ether-insoluble polymer isolated as described in the foregoing example was shown to be highly crystalline by its X-ray diffraction pattern. It was a hard, white, film-like solid. A total solids at the end of the run showed 14% conversion to a hard, somewhat waxy solid.

EXAMPLES 3–14

In each of these examples 10 parts of trans-butene-2 oxide was polymerized under a nitrogen atmosphere using toluene (T) or n-heptane (H) as the diluent under varying reaction conditions. The catalyst used in Examples 3–8 was triisobutylaluminum, which was added as a 0.9 M solution in n-heptane, being added in Example 3 in two equal portions at 0 and 23 hours, in Examples 4 and 5 in three equal portions at 0, 1 and 2 hours, in Example 6 in three equal portions at 0, 19, and 26 hours, in Example 7 in two equal portions at 0 and 2.5 hours, and in Example 8 all at the beginning of the reaction. In Examples 9 and 10 the catalyst used was the organoaluminum compound obtained by reacting aluminum with hydrogen and isoprene expressed as having the formula $Al(C_5H_9)_3$, in Example 11 the catalyst was the reaction product of triisobutylaluminum and isoprene which contained about one isobutyl group per aluminum, and in Example 14 the catalyst was tri-n-octylaluminum. In Examples 12 and 13 the catalyst was triisobutylaluminum, added in Example 12 slowly over a period of 2.2 hours. In Table I is set forth the diluent, the catalyst and the amount of each used, and the time and temperature at which the polymerization was carried out, together with the yield and characteristics of the polymers produced. In each case at the end of the given reaction time, the polymerization was stopped by adding four parts of anhydrous ethanol.

In Examples 3–8 the polymer was isolated by adding sufficient ether to make the solution of low viscosity for ease in handling, then washing the reaction mixture first with a 3% aqueous solution of hydrogen chloride, then with water until neutral, then with a 2% aqueous solution of sodium bicarbonate and again with water. The ether-insoluble polymer was then separated, washed once with ether, and once with a 0.1% solution of Santonox, i.e. 4,4'-thiobis(6-tert-butyl-m-cresol), in ether and dried. To the ether filtrate was added an amount of Santonox equal to 0.5% based on the polymer, the solvents were then removed, and the ether-soluble polymer so obtained was dried. In Example 6, the ether-insoluble polymer was further purified by dissolving it in chloroform, filtering the solution, removing the solvent, drying and then dissolving it in acetone at 80–100° C., allowing it to crystallize from the acetone solution at room temperature, collecting the crystalline polymer, washing the latter with acetone and 0.5% Santonox in acetone and drying the so-purified polymer. In Examples 9–14 the polymer was isolated by diluting the reaction mixture with n-heptane and then washed as described for Examples 3-8. The heptane-insoluble polymer was then separated, washed with n-heptane, then with a 0.1% solution of Santonox in heptane and dried. The heptane-soluble polymer was isolated by adding 0.5% Santonox, removing the solvents and drying the polymer.

In Table I is set forth the percent conversion to isolated insoluble and isolated soluble polymer, the RSV (0.1% solution in chloroform at 25° C.), the crystallinity as indicated by X-ray diffraction analysis and the melting point of the polymer. In addition, films were prepared from a number of those polymers by compression-molding at 125° C. and the physical properties determined on these films are also tabulated. In Examples 6 and 8, the compression-molded film produced from the isolated soluble polymer was oriented by drawing at room temperature at a draw ratio of 4:1 and 4.5:1 respectively. In Example 7 the compression-molded film produced from the isolated insoluble polymer was oriented by drawing at room temperature at a draw ratio of 4.5:1. The physical properties of these oriented films are set forth in the table in parentheses under those of the unoriented film.

ethanol. The heptane-insoluble and heptane-soluble polymers were isolated as described above in Examples 9-14. There was obtained a conversion of 13.6% of heptane-insoluble polymer and 74% of heptane-soluble polymer. The heptane-soluble polymer had an RSV of 0.46 (0.1% in chloroform at 25° C.) and was a very tacky rubber. The heptane-insoluble polymer had an RSV of 8.7 (0.1% in α-chloronaphthalene at 135° C.), was crystalline by X-ray and had a melting point of 122° C. It was a white, tough solid which was insoluble in ether, water, benzene and chloroform at room temperature, but was soluble in chloroform at 80–100° C.

EXAMPLE 16

Cis-butene-2 oxide, 10 parts, was polymerized under a nitrogen atmosphere in 62.8 parts of n-heptane using as the catalyst 0.46 part of triethylaluminum which had been prereacted with water and acetone. This catalyst was prepared by reacting triethylaluminum at 0.5 M concentration in 70:30 ether:n-heptane at 0° C. with 0.5 mole of water per mole of aluminum, stirring for one hour at 0° C. and then reacting with 0.5 mole of acetylacetone per mole of aluminum, and again stirring at 0° C. for

*Table I*

| Ex. | Diluent | | Catalyst | | Reaction conditions | | Isolated insoluble polymer | | | |
|---|---|---|---|---|---|---|---|---|---|---|
| | Name | Parts | Description | Parts | Hrs. | ° C. | Percent conv. | RSV | X-ray cryst. | M.P. ° C. |
| 3 | T | 39.8 | $Al(i-C_4H_9)_3$ | 1.6 | 42 | 30 | 0.06 | | | |
| 4 | T | 31.8 | $Al(i-C_4H_9)_3$ | 2.4 | 19 | 30 | 0.2 | | | |
| 5 | H | 24.8 | $Al(i-C_4H_9)_3$ | 2.4 | 20 | 30 | 37 | 1.2 | High | 90 |
| 6 | H | 24.8 | $Al(i-C_4H_9)_3$ | 2.4 | 43 | 5 | 22 | 2.3 | ...do | 82 |
| 7 | H | 24.8 | $Al(i-C_4H_9)_3$ | 1.6 | 4.5 | −30 | 65 | 2.6 | ...do | 79 |
| 8 | H | 25.0 | $Al(i-C_4H_9)_3$ | 2.4 | 18 | −78 | 44 | 4.4 | Mod | 71 |
| 9 | H | 127 | $Al(C_5H_9)_3$ | 2.2 | 2 | −78 | 65 | 2.2 | High | 85 |
| 10 | H | 30.2 | $Al(C_5H_9)_3$ | 0.9 | 19 | 5 | 62 | 1.6 | ...do | 80 |
| 11 | H | 31.5 | $Al(C_5H_9)_2(i-C_4H_9)$ | 0.8 | 19 | 5 | 37 | 1.0 | ...do | 88 |
| 12 | H | 59.2 | $Al(i-C_4H_9)_3$ | 2.4 | 5 | −72 | 64 | 2.4 | Mod | 92 |
| 13 | H | 59.2 | $Al(i-C_4H_9)_3$ | 2.4 | 21 | −78 | 57 | 7.3 | Mod | 79 |
| 14 | H | 65.2 | $(nC_8H_{17})_3Al$ | 1.4 | 19 | −78 | 93 | 2.5 | High | 87 |

| | Isolated insoluble polymer—Con. | | | Isolated soluble polymer | | | | | | |
|---|---|---|---|---|---|---|---|---|---|---|
| | Physical properties | | | | | | | | Physical properties | |
| | Tensile | | Ultimate elongation, percent | Percent conv. | RSV | X-ray cryst. | M.P. ° C. | Tensile | | Ultimate elongation, percent |
| Ex. | Strength, p.s.i. | Modulus, p.s.i. | | | | | | Strength, p.s.i. | Modulus, p.s.i. | |
| 3 | | | | 55 | 1.0 | High | 83 | 1,600 | 25,500 | 280 |
| 4 | | | | 64 | 0.89 | ...do | 85 | 1,700 | 39,000 | 40–150 |
| 5 | 1,800 | 43,000 | 250 | 32 | 0.89 | ...do | | | | |
| 6 | 2,890 | 38,600 | 380 | 52 | 1.2 | ...do | 82 | 2,900 (24,000) | 43,000 (141,000) | 400 (31) |
| 7 | 3,500 (19,000) | 44,000 (130,000) | 450 (32) | 2 | 2.6 | | | | | |
| 8 | 2,800 | 41,000 | 360 | 36 | 3.4 | High | 73 | 3,000 (17,000) | 33,000 (73,000) | 420 (35) |
| 9 | 3,200 | 36,000 | 430 | 4 | 0.16 | | | | | |
| 10 | 3,300 | 39,400 | 450 | 8 | 0.16 | High | | | | |
| 11 | 1,800 | 45,000 | 35 | 10 | 0.16 | | | | | |
| 12 | 2,800 | 51,000 | 390 | 5 | 0.8 | Mod | 71 | Somewhat brittle film | | |
| 13 | | | | 2 | 0.3 | Mod | 68 | | | |
| 14 | | | | 3 | 0.1 | Low | 62 | | | |

EXAMPLE 15

Cis-butene-2 oxide, 10 parts, was polymerized in 64.2 parts of n-heptane using as the catalyst 0.68 part of triethylaluminum which had been prereacted with acetylacetone and water. This catalyst was prepared by reacting triethylaluminum at a 1 M concentration in n-heptane in the presence of 3 moles of ether per mole of aluminum at 0° C. with 0.13 mole of acetylacetone per mole of aluminum and then, after stirring for one hour, with 0.5 mole of water per mole of aluminum. After stirring for 15 minutes at 0° C., the catalyst was aged at least one day before use. After 19 hours at 30° C., the polymerization was stopped by adding 4 parts of anhydrous 15 minutes. It was then aged for at least one day before use. After 19 hours at 30° C., the polymerization was stopped by adding 4 parts of anhydrous ethanol and the ether-soluble and ether-insoluble polymers were isolated by the procedure described in Examples 3–8. There was obtained a conversion of 23% of ether-soluble polymer which had an RSV of 1.1 (0.1% in α-chloronaphthalene at 135° C.) and was a tacky, snappy rubber. The ether-insoluble polymer amounted to a conversion of 28%. It had an RSV of 7.7 (0.1% in tetrachloroethane at 100° C.). It was crystalline by X-ray and had a melting point of 123° C. Analysis for carbon and hydrogen showed 66.44% C (theory 66.6%) and 11.15% H (theory 11.18).

A film of this polymer prepared by compression-molding at 155° C. had a tensile strength of 3300 p.s.i., a modulus of 15,000 p.s.i. and an ultimate elongation of 180%. The physical properties of this film were enhanced by orientation. The approximate solvent absorption after 24 hours at room temperature in various solvents was benzene 10%, dichloroethylene 15%, hexane 7% and water 2%. A film prepared from this same polymer by compression-molding at about 210° C. and cooling to room temperature gave a very rubbery but strong film.

EXAMPLE 17

Example 16 was repeated except that the catalyst was prepared by reacting 0.46 part of triethylaluminum at 0.5 M concentration in 70:30 ether:n-heptane at 0° C. with 0.9 mole of acetylacetone per mole of aluminum, stirring for 1 hour at 0° C. and then reacting with 0.5 mole of water per mole of aluminum and aging at least one day at room temperature before use. The polymerization was run at 30° C. for 19 hours and then at 50° C. for 23 hours before stopping. There was obtained an ether-soluble polymer in a conversion of 10%, which polymer had an RSV of 3.0 (0.1% in α-chloronaphthalene at 135° C.) and was a snappy rubber. The ether-insoluble polymer amounted to a conversion of 15% and it had an RSV of 8.3 (0.1% in α-chloronaphthalene at 135° C.).

It was a tough, white solid which was crystalline by X-ray and which had a melting point of 162° C.

EXAMPLES 18–21

In each of these examples 10 parts of cis-butene-2 oxide was polymerized in 65.6 parts in Examples 18 and 20, 62.8 parts in Example 19 and 29.2 parts in Example 21 of n-heptane. The catalysts used in Examples 18–20 were prepared as described in Example 15 except the water was added prior to the acetylacetone. In Example 18, 0.46 part of triethylaluminum which had been reacted with 0.5 mole of water and 0.9 mole of acetylacetone per mole of aluminum had been used. The catalyst used in Example 19 was 0.92 part of triethylaluminum reacted with 0.5 mole of water and 1.0 mole of acetylacetone per mole of aluminum. The catalyst used in Example 20 was 0.46 part of triethylaluminum reacted with 0.5 mole of water and 0.5 mole of acetylacetone per mole of aluminum. In Example 21 the catalyst used was prepared by reacting 0.46 part of triethylaluminum at 0.5 M concentration in n-heptane at 0° C. with 1.0 mole of acetylacetone per mole of aluminum and after stirring for 15 minutes at 0° C., allowing it to age at room temperature one day before use. After 19 hours at 65° C. in each case, the polymerization was stopped by adding 4 parts of anhydrous ethanol. Sufficient ether was then added to make the solution of low viscosity for ease in handling, and the reaction mixtures were worked up and the ether-insoluble and ether-soluble polymers were isolated as described in Examples 3–8.

In Table II is set forth the percent conversion to ether-soluble and ether-insoluble polymer in each case, the RSV of each polymer as determined on a 0.1% solution in tetrachloroethane at 100° C. The ether-insoluble polymers in each case were shown to be crystalline by X-ray, and their melting points are given in the table. A film was prepared from the ether-insoluble polymer of Example 18 by compression molding at 210° C. for 5 minutes and then cooling to room temperature. The physical properties of this film are tabulated below. The ether-insoluble polymer of Example 19 was milled with 50 parts of high abrasion furnace black per 100 parts of polymer for about 5 minutes on a two-roll mill at about 330–340° F. It was then compression molded at 360° F. for 10 minutes. Its physical properties are set forth in the table. In addition, it had a hardness (Shore A2) of 75 and a break set of 95%.

This application is a continuation-in-part of my application U.S. Serial No. 738,651, filed May 29, 1958, and now abandoned.

Table II

| Ex. | Isolated ether-insoluble polymer | | | | | | Isolated ether-soluble polymer | | |
|---|---|---|---|---|---|---|---|---|---|
| | | | | Physical properties | | | | | |
| | Percent conv. | RSV | M.P., °C. | Tensile | | Ultimate elongation, percent | Percent conv. | RSV | Description |
| | | | | Strength, p.s.i. | Modulus, p.s.i. | | | | |
| 18 | 56 | 9.1 | 126 | >1,000 | 1,900 | 360 | 8 | 5.6 | Tacky, snappy rubber. |
| 19 | 85 | 17.1 | 121 | 1,205 | 1,205 | 400 | 15 | 5.4 | Do. |
| 20 | 77 | 14.1 | 130 | | | | 12 | 3.0 | Do. |
| 21 | 23 | 7.7 | 127 | | | | 12 | 3.7 | Do. |

What I claim and desire to protect by Letters Patent is:

1. As a new composition of matter a crystalline homopolymer of a 2,3-epoxybutane.
2. As a new composition of matter a crystalline homopolymer of trans-2,3-epoxybutane.
3. As a new composition of matter a crystalline homopolymer of cis-2,3-epoxybutane.
4. An oriented film of a crystalline homopolymer of trans-2,3-epoxybutane.
5. An oriented film of a crystalline homopolymer of cis-2,3-epoxybutane.

References Cited in the file of this patent

UNITED STATES PATENTS

| | | |
|---|---|---|
| 2,706,181 | Pruitt et al. | Apr. 12, 1955 |
| 2,706,182 | Pruitt et al. | Apr. 12, 1955 |
| 2,706,189 | Pruitt et al. | Apr. 12, 1955 |
| 2,844,545 | Borkovec | July 22, 1958 |
| 2,870,099 | Borrows et al. | Jan. 20, 1959 |
| 2,870,100 | Stewart et al. | Jan. 20, 1959 |
| 2,987,489 | Bailey et al. | June 6, 1961 |